United States Patent [19]

Wise et al.

[11] 4,182,054

[45] Jan. 8, 1980

[54] ARTIFICIAL ARM

[75] Inventors: Charles D. Wise; Ernest E. Lowrey; Oliver W. Lowrey; Thomas R. Williams; Price Neeley, all of Gatesville, Tex.

[73] Assignee: Medical Plastics Laboratory, Inc., Gatesville, Tex.

[21] Appl. No.: 878,229

[22] Filed: Feb. 16, 1978

[51] Int. Cl.² ............................................. G09B 23/30
[52] U.S. Cl. .......................................................... 35/17
[58] Field of Search ............................................ 35/17

[56] References Cited

U.S. PATENT DOCUMENTS

| | | | |
|---|---|---|---|
| 2,324,702 | 7/1943 | Hoffman | 35/17 |
| 2,689,415 | 9/1954 | Haver | 35/17 |
| 2,704,897 | 3/1955 | Lade | 35/17 |
| 2,871,579 | 2/1959 | Niiranen | 35/17 |
| 3,722,108 | 3/1973 | Chase | 35/17 |
| 3,789,518 | 2/1974 | Chase | 35/17 |

OTHER PUBLICATIONS

Chase Hospital Dolls, p. 173 of 1973 Clay–Adams Catalog.

*Primary Examiner*—Harland S. Skogquist
*Attorney, Agent, or Firm*—Gerald G. Crutsinger

[57] ABSTRACT

Apparatus to artificially simulate arteries of a limb for training medical personnel to puncture arteries and veins. The device comprises a hollow arm shaped member constructed of a resilient material having two grooves formed on the exterior thereof in the area of the elbow and wrist simulating the brachial artery and radial artery area. A resilient artery is formed of tubing which is positioned through the hollow bore of the arm and through the grooves in the elbow and wrist area. A latex skin is positioned over the arm to cover the tubing and grooves to simulate the skin. The tubing is attached to a liquid container above the arm to simulate blood and cause a arterial or venous pressure for a lifelike back flow of liquid into the syringe.

12 Claims, 3 Drawing Figures

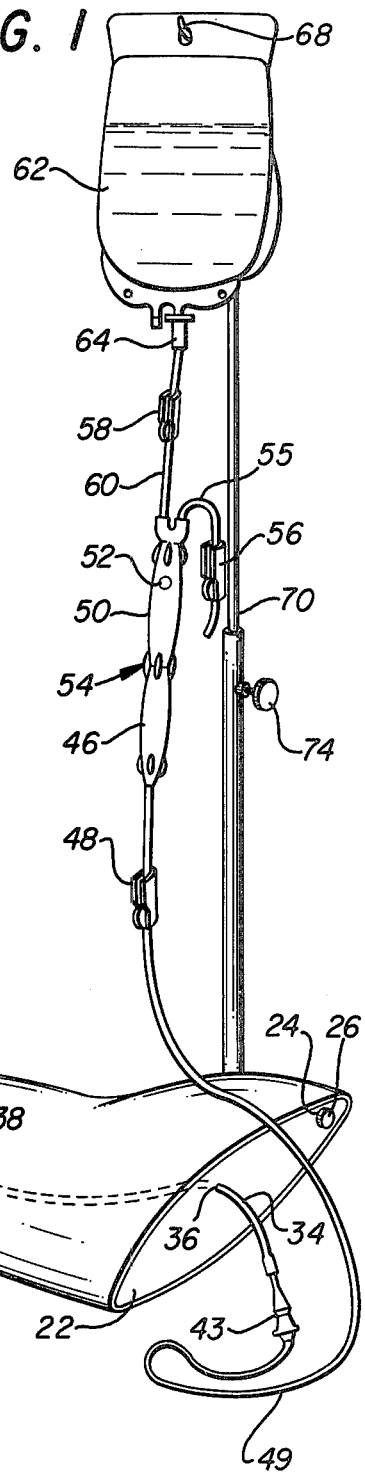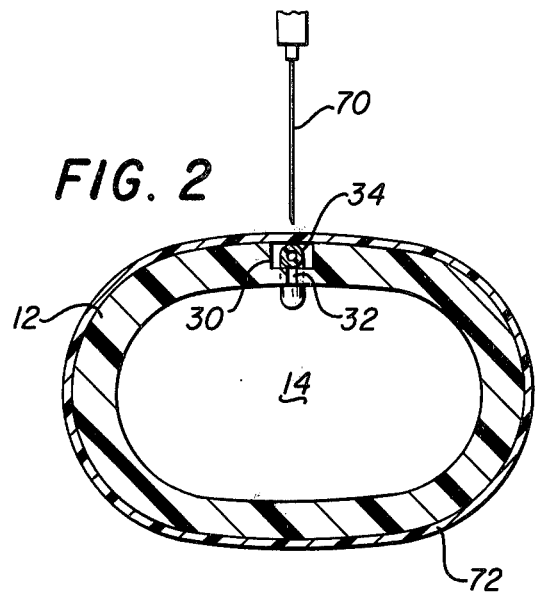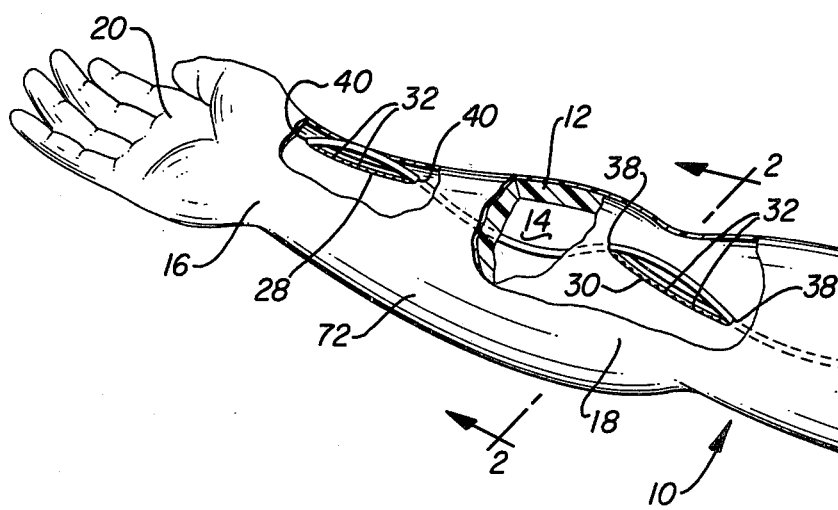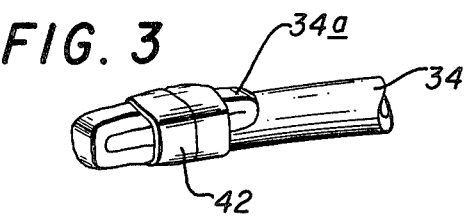

ARTIFICIAL ARM

BACKGROUND

In training medical personnel such as medical technicians, nurses, and doctors, it is necessary that they learn the technique of finding a vein or artery for administering drugs or removal of blood. In some patients this becomes very difficult because of their anatomy. Further, it is also difficult to learn the technique properly on the first attempt. Since the comfort of the patient is upmost in the medical field, it is not desirable for a student to practice on a human patient until he learns the technique because of the discomfort and pain which may be inflicted by repeated attempts to introduce the needle into the vein or artery.

For this reason, it is desirable to have an artificial member of the body which simulates arteries and veins for practicing injections into the arteries or veins for classroom technique before practicing on a live patient.

SUMMARY

We have devised an artificial limb for simulating arteries and veins in the elbow and wrist areas which have a blood pressure to provide an anatomical accurate arm to simulate a patient to teach the concepts, technique, and manual dexterity associated with arterial and venous puncture.

The arm comprises a hollow resilient core member having a groove formed in the elbow and wrist areas. A tubing is positioned through the bore of the arm into the grooves in the elbow and wrist area exposing the tubing to the upper portion of the surface of the arm. The tubing is clamped at one end and the end extending out of the arm is secured to a liquid container to simulate blood pressure which depends upon the heighth the container is raised above the arm and or pressing pump between fingers.

An artificial skin cover, formed of a latex material, simulates the skin and is drawn over the arm to cover the tubing such that the tube will be barely visible under the skin. The cover simulates the smoothness texture of actual skin, thereby giving a realistic member to practice on.

A student then takes a needle for an injection and is taught how to proceed. When one hits the artery or vein tubing the colored liquid will back flow in the syringe in the same manner blood will flow from an artery or vein of a live patient.

Holes are formed i the groove in the arm such that any excess liquid from leaking of puncture sites will drain into the hollow bore of the arm for draining and cleaning the arm through a drain hole formed at one end to maintain the realistic anatomy of the arm.

A primary object of the invention is to provide an accurate anatomical arm to simulate a patient's member to teach the concepts, techniques and manual dexterity associated with arterial or venous puncture for obtaining blood samples.

A further object of the invention is to provide a realistic arterial and venous pressure within the artery to produce a lifelike back flow in the syringe and varied pulse rates which may be manually produced at the descretion of the instructor.

A further object of the invention is to provide areas which are normally subjected to intravenous puncture in the hand, elbow and wrist areas to simulate the brachial artery and the radial artery and veins.

A still further object of the invention is to provide an anatomical arm which simulates the skin to accustom the trainee in penetrating the skin to find the arteries and veins which are barely visible below the skin.

Other and further objects of the invention will become apparent upon studying the detailed specification following and the drawings annexed hereto.

BRIEF DESCRIPTION OF THE DRAWINGS

Drawings of a preferred embodiment of the invention are annexed hereto so that the invention may be better and more fully understood, in which:

FIG. 1 is a perspective view of the area with parts broken away to more clearly illustrate the details of construction;

FIG. 2 is a cross-sectional view taken along line 2—2 of FIG. 1; and

FIG. 3 is an enlarged perspective view of the clamped end of artery tubing.

DESCRIPTION OF A PREFERRED EMBODIMENT

Referring to FIG. 1 of the drawings, the numeral 10 generally refers to the artificial anatomical arm of a simulated patient. The arm 10 generally comprises a hollow core 12 constructed of a resilient material such as vinyl plastic or latex rubber having a bore 14. Arm 10 generally has a wrist area 16, an elbow area 18, and a hand 20. An end wall 22 seals off the end of the bore 14. A drain hole 24 is closed by a stopper 26 to allow drainage of fluid from bore 14. It should be readily apparent that arm 10 may be shaped to simulate any other body member such as a leg, etc.

A groove 28 is formed in the surface of the wrist area 16 and a groove 30 is formed in the surface of the anticubital or elbow area 18 of the arm 10. Apertures 32 are formed in the lower portion of the grooves 28 and 30 communicating with the bore 14 of the arm 10.

A hollow tubing 34 constructed of industrial tubing of rubber or vinyl forms artificial arteries and/or veins. The tubing 34 is journalled through passage 36 in end wall 22 into groove 30 through passages 38 formed at each end of groove 30 such that the tubing 34 is positioned in groove 32 on the surface of arm core 12. The tubing 34 passes through the bore 14 and passages 40 at each end of the groove 28 in a like manner so that it lies in groove 32. The end of tubing 34 is folded back at end 34a and clamped by a rubber band 42 as illustrated in FIG. 3.

The end of tubing 34 is connected by connection means such as adapter 43 to tubing 44 which is connected to a typical filter chamber 46. A proximal clamp 48 is attached to tubing 44 to control the flow therethrough.

Filter chamber 46 is a two-part pump apparatus having a drip chamber 50 formed on the upper side thereof. The drip chamber 50 has a ball valve 52 formed therein which indicates the flow of fluid through the pump generally designated 54 which allows control of pulse rates such that the rate may be varied. A clamp 56 controls the amount of air admitted into air inlet tube 55 and therefore the passage of fluid through pump 54. The second clamp 58 located on tubing 60 controls the flow through the tubing 60. Tubing 60 communicates with the container 62 which is generally a plastic bag or IV bottle through connector 64. The container 62 may have blood colored liquid contained therein to simulate blood. Container 62 is attached by hook 68 to an adjustable telescoping IV stand 70. Gravity flow from the container 62 represents the diastolic pressure of the blood. To maintain a desired mercury pressure, the top level of the liquid within the container is set to a predetermined length. For example, to maintain a 60 mm diastolic mercury pressure the heighth of the top of the water level within the container 62 should be set at approximately 32 inches. To maintain a 90 mm diastolic mercury pressure, the heighth of the top of the water in container 62 should be set at approximately 48 inches. By controlling the heighth of the container 62 one can control the pressure. The heighth of container 62 is adjustable by adjusting stand 70 up and down by turning knob 74.

The typical needle used in intravenous injections is a 21 gauge needle 70 approximately one and a half inches long or smaller. As illustrated in FIG. 2, the needle 72 is used to penetrate the tubing 34. Any liquid which leaks out of the tubing 34 will pass through passages 32 into the hollow bore 14 of the arm 10.

In order to simulate the skin and cover the tubing 34 and control the difficulty of finding an artery, a simulated skin textured cover 72 is positioned over the core 12 of the arm. The cover 72 is preferably comprised of a special latex having a skin-like feeling. The cover 72 is preferably drawn over the tubing and core 12 after the interior of the cover 72 has been coated with talcum powder. Several layers of cover 72 may be placed over the wrist and elbow area to make difficulty of injecting the radial and brachial arteries more difficult. The cover 72 may be removed for cleaning.

After the arm 10 has been used for instruction, it is preferably drained through drain hole 24 by removing stopper 26. The special skin 72 may be removed so that the arm may be washed to remove any dye remaining from the color concentrate liquid and to prevent deterioration of the arm 10.

It should be readily apparent that the round tubing 34 simulates an artery or vein within the grooves 28 and 30 such that the tubing 34 can roll within the grooves 28 and 30 to simulate the roll of the artery within an actual arm. This simulates the actual difficulties incurred in attempting to puncture an artery with a needle 70.

This allows the trainee to be trained on a simulated member which is anatomically accurate.

It should be readily apparent that from the foregoing the embodiment of the invention accomplishes the objects of the invention hereinbefore discussed.

It should be appreciated that other and further embodiments of the invention may be devised without departing from the basic concept thereof.

Having described our invention, we claim:

1. In an artificial member for teaching puncturing of a blood vessel, the combination comprising: a hollow resilient core having a drain passage formed therein, said core further having grooves formed in the surface of the core, said grooves each having at least one passage formed therein which communicates with the bore of the hollow core which allows fluid to pass into the hollow core; a hollow resilient tube positioned through said core wall such that the tube extends into and through said grooves; means to close one end of said tube and a skin textured cover disposed over the core and tubing.

2. The combination called for in claim 1 with the addition of: a liquid container; connector means connecting said liquid container to said hollow resilient tube; and means to secure said liquid container above said arm.

3. The combination called for in claim 2 with the addition of: a pump disposed between the liquid container and connector means to allow variation of pulse rates within the tubing.

4. The combination called for in claim 1 wherein said hollow resilient core is shaped to simulate a human limb.

5. The combination called for in claim 4 wherein said limb is an arm.

6. The combination called for in claim 5 wherein the grooves are formed in the surface of the core in the wrist and elbow areas.

7. The combination called for in claim 1 wherein the passages in the grooves comprise: a plurality of perforations to allow drainage of fluid from the groove into the hollow core; and passages to allow passage of the tube into and out of the groove.

8. In an artificial arm for teaching techniques to puncture an artery or vein, a combination comprising: a hollow, resilient arm shaped member having a drain passage formed at one end, said arm shaped member further having grooves formed in the wrist area and elbow area, said grooves having a passage through the wall thereof communicating with the interior of the hollow arm shaped member; a hollow resilient tube positioned through the member, said tube being extended through the grooves in the wrist and elbow area to simulate the radial and brachial arteries and veins in those area; a liquid container; means securing said liquid container above said member; connector means connecting the liquid container to the tube; liquid within said liquid container; and a resilient skin textured cover detachably secured over the member and tube.

9. The combination called for in claim 8 wherein the connector means comprises: tubing; and a filter-drip chamber secured between the tubing and liquid container to control the flow of liquid in the tubing.

10. The combination called for in claim 8 wherein the means securing said liquid container above said member comprises: an adjustable telescoping stand, said stand having a hook formed on the upper end adapted to hold said liquid container.

11. In a device for teaching techniques of puncturing an artery of the human body; a hollow resilient member, at least one groove formed in the surface of the member and one or more perforations formed through the wall of the groove communicating with the hollow portion; a resilient tube extending through the hollow portion of the member, through the wall of the member; along said groove and back through the wall into the hollow portion of the member; and a resilient skin textured cover secured over the member and tube.

12. In a device for teaching puncturing of a blood vessel, the combination comprising: a hollow resilient core having a groove in the surface of the core, each end of the groove having a passage communicating with the hollow portion of the core; a resilient tube adapted to permit fluid to flow therethrough disposed through the passages formed at each end of the groove, said passages being large enough to prevent drainage of fluid from the groove into the hollow portion of the core; means to close one end of the tube; and a cover disposed over the core and the tube.

* * * * *